United States Patent
Tredoux et al.

(10) Patent No.: US 7,844,749 B2
(45) Date of Patent: Nov. 30, 2010

(54) LOCALIZATION KEY AND CORRESPONDING METHODS

(75) Inventors: Gavan Tredoux, Penfield, NY (US); Ian Finlay, Rochester, NY (US); Robert Allen Koontz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 265 days.

(21) Appl. No.: 11/936,346

(22) Filed: Nov. 7, 2007

(65) Prior Publication Data

US 2009/0119017 A1 May 7, 2009

(51) Int. Cl.
*G06F 3/00* (2006.01)
*H04W 4/00* (2009.01)

(52) U.S. Cl. ........................................ 710/8; 455/435.1

(58) Field of Classification Search ....................... 710/8
See application file for complete search history.

(56) References Cited

U.S. PATENT DOCUMENTS

| | | | | |
|---|---|---|---|---|
| 5,642,303 A * | 6/1997 | Small et al. ................. | 708/109 |
| 6,892,251 B2 | 5/2005 | Anderson et al. | |
| 7,162,237 B1 * | 1/2007 | Silver et al. ............... | 455/432.3 |
| 2003/0227641 A1 * | 12/2003 | Edmonds et al. ........... | 358/1.13 |
| 2004/0203768 A1 * | 10/2004 | Ylitalo et al. ............. | 455/435.1 |
| 2005/0099442 A1 * | 5/2005 | Payne .......................... | 347/14 |
| 2007/0028046 A1 | 2/2007 | Pham | |
| 2007/0077944 A1 * | 4/2007 | Bellenger et al. ........ | 455/456.1 |

* cited by examiner

*Primary Examiner*—Henry W Tsai
*Assistant Examiner*—Titus Wong
(74) *Attorney, Agent, or Firm*—Ronald E. Prass, Jr.; Prass LLP

(57) ABSTRACT

Disclosed are methods of providing an electronic device and a corresponding localization key to a customer for localization of the electronic device, as well as a corresponding localization key and computer-readable medium. The methods select a localization key corresponding to the location of the customer, and provide the electronic device and the selected localization key for delivery to the customer. The selected localization key includes a computer-readable medium having stored thereon instructions for execution by a processor of the electronic device. When the localization key is interfaced to the electronic device, the instructions cause the processor of the electronic device to select one of a plurality of localization profiles indicated by the instructions to correspond to the location of the customer and to implement the selected localization profile on the electronic device.

18 Claims, 3 Drawing Sheets

LOCALIZATION KEY AND CORRESPONDING METHODS

BACKGROUND

Disclosed are a localization key and corresponding methods for establishing localization of an electronic device.

Electronic devices such as printers, copiers, multi-function devices, and the like provide users the ability to print, copy, scan and the like. The electronic devices may be stand alone devices, or may be connected in a network, such as in a business computing environment, which may include one or more printers, for example.

These electronic devices are typically sold internationally into different markets that utilize different languages, currencies, time zones and other configuration elements which are specific to the location, such as a country locality. Selection of these items is typically known as "localization". A given market may have a plurality of such localizations, for example in countries such as Belgium having different parts of the country using different languages.

Such electronic devices may require that a customer select such localization items upon setting up the electronic device. This may typically involve use of a device user interface for selection of the items in localization. This may prove difficult, because the device interface used for localization may not be localized, and may be in a language different from the language of the customer. Thus, the user interface may require the initial localization in the English language, and the customer setting up the device may not speak English. Thus the localization may end up being unnecessarily complex and cumbersome to the customer.

SUMMARY

According to aspects of the embodiments, there is provided methods of providing an electronic device and a corresponding localization key to a customer for localization of the electronic device. The methods select a localization key corresponding to the location of the customer; and provide the electronic device and the selected localization key for delivery to the customer. The selected localization key includes a computer-readable medium having stored thereon instructions for execution by a processor of the electronic device. When the localization key is interfaced to the electronic device, the instructions cause the processor of the electronic device to select one of a plurality of localization profiles indicated by the instructions to correspond to the location of the customer and to implement the selected localization profile on the electronic device.

DETAILED DESCRIPTION

Aspects of the disclosed embodiments relate to methods for providing localization for an electronic device, and corresponding apparatus and computer readable medium. The disclosed embodiments allow a customer of the electronic device to easily complete a localization process for the device.

As used herein, the term "location" shall refer to any fact or data relevant to the operation of a device (such as, but not limited to, power requirements, language display, environmental requirements such as default duplex or anti-flicker) that can be in any way related to geographic location in which the device is operating or effectively operating.

The disclosed embodiments include methods for providing an electronic device and a corresponding localization key to a customer for localization of the electronic device, the methods including determining a location of the customer; selecting a localization key corresponding to the location of the customer; and providing the electronic device and the selected localization key for delivery to the customer, the selected localization key including a computer-readable medium having stored thereon instructions for execution by a processor of the electronic device, wherein when the localization key is interfaced to the electronic device, the instructions cause the processor of the electronic device to select one of a plurality of localization profiles indicated by the instructions to correspond to the location of the customer and to implement the selected localization profile on the electronic device.

The disclosed embodiments further include a localization key that includes a computer-readable memory that stores localization instructions for execution by a processor of the electronic device, the localization instructions corresponding to a location of the customer; and an interface for connection to the electronic device, wherein when the interface of the localization key is interfaced to the electronic device, the localization instructions cause the processor of the electronic device to select one of a plurality of localization profiles indicated by the instructions to correspond to the location of the customer and to implement the selected localization profile on the electronic device.

The disclosed embodiments further include a computer-readable medium comprising a computer-usable data carrier storing instructions including an indication of a location of a customer, the instructions when executed by a processor of an electronic device causing the processor to: select one of a plurality of localization profiles indicated by the instructions to correspond to the location of the customer; and implement the selected localization profile on the electronic device.

Figure 1:
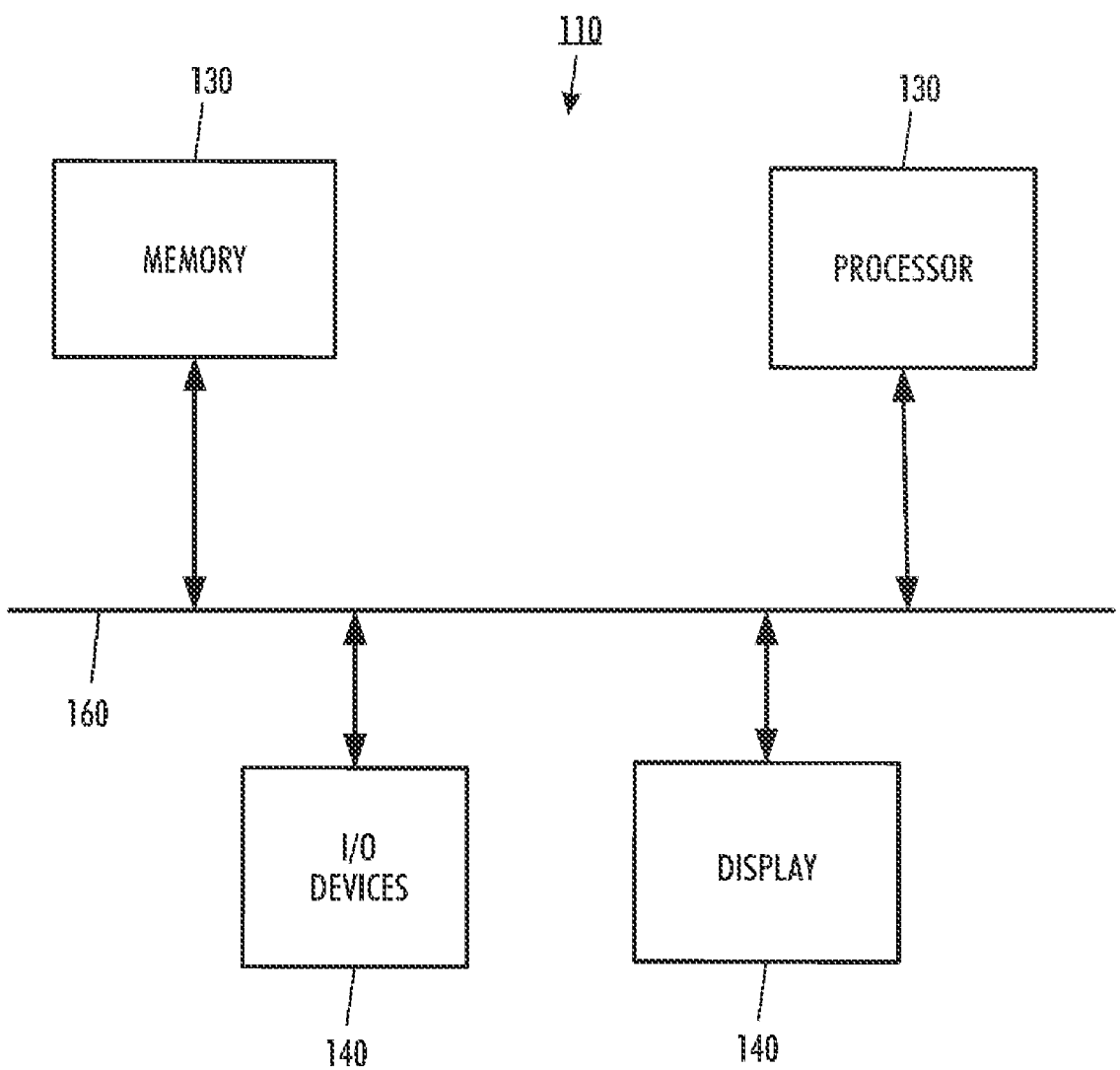
FIG. 1 illustrates a block diagram of a system for localization for an electronic device.

FIG. 1 illustrates a diagram of a system 110. The system 110 may be embodied within devices such as a desktop computer, a laptop computer, a handheld computer, a handheld communication device, or another type of computing or electronic device, or the like. The system 110 may include a memory 120, a processor 130, input/output devices 140, a display 150 and a bus 160. The bus 160 may permit communication and transfer of signals among the components of the computing device 110.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 100 may be a stand-alone system, such as a personal computer, or may be connected to a network such as an intranet, the Internet, and the like. Other elements may be included with the system 110 as needed.

The memory 120 may store instructions that may be executed by the processor to perform various functions. For example, the memory may store instructions to allow the system to perform various printing functions in association with a particular printer connected to the system.

Figure 2:
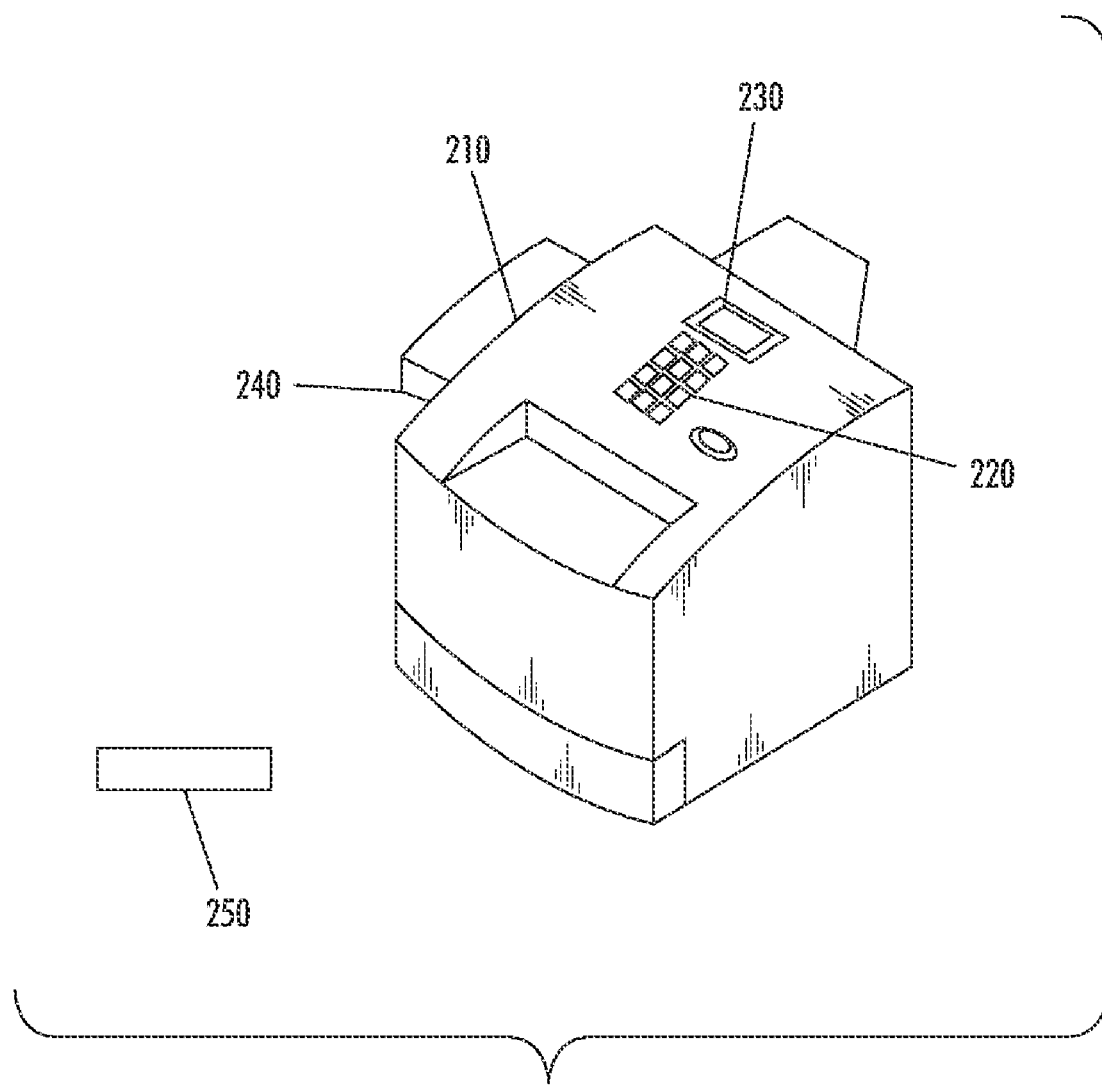
FIG. 2 illustrates a block diagram of electronic devices and medium used in establishing communication parameters for an electronic device.

FIG. 2 illustrates various electronic devices that may be used with the embodiments. In particular, FIG. 2 illustrates first electronic device 210 and second electronic device 250. The first electronic device 210 typically may include the elements of system 110, including the memory 120, the processor 130, I/O devices 140, a display 150 and other items as needed.

The first electronic device 210 may include various input/output devices such as a keyboard 220, a display 230, a mouse, connectors for cabling, a wireless interface, and the like. The display 230 may display images to be viewed by a user.

The first electronic device 210 may also include other input or output interfaces, such as a USB (universal serial bus) port 240, and the like. A USB port allows peripherals, such as USB flash drive, or other removable computer-readable medium, to be connected to, and interface with the USB port 240 and with a processor, memory and other elements within the first electronic device 210. Information may be downloaded from the first electronic device and stored on the USB flash drive, such as executable programs, drivers, configuration data, and the like. Other types of computer-readable medium may be used in place of the flash drive.

The second electronic device 250 may be a localization key as illustrated in FIG. 2, and may be embodied in an element such as a USB flash drive, and the like. The localization key may be embodied in another type of computer-readable medium, such as a CD or miniCD, DVD or miniDVD, floppy disk, memory stick, mini or microSD, and the like. Some of these computer-readable medium require an interface other than a USB port, such as a DVD and/or CD reader, a miniSD memory card slot, and the like. The appropriate type of computer-readable medium may be used as the localization key dependent on the interfaces available on the first electronic device 210.

Disclosed embodiments allow a user wanting to perform localization on the first electronic device 210, to easily do so by interfacing the localization key to the first electronic device 210, via the interface 240. Embodiments may perform the localization in several ways. For example, a plurality of localization profiles may be loaded into the memory of the first electronic device 210 before it is sent to the customer. The localization profiles may allow the first electronic device to be localized to a particular language, a particular time zone, a particular currency, and the like, as needed.

The localization key as embodied in the second electronic device 250 may include an indication of a particular localization profile to be implemented on the first electronic device 210. Thus, when an electronic device such as the first electronic device 210 is being provided to a customer for the first time, the customer's location can be determined, and a localization key that has an indication of a particular localization profile corresponding to the user's location can be provided for delivery to that customer with the first electronic device. Then, when the customer receives delivery of the first electronic device, the customer may simply interface the localization key to the interface 240 to perform the localization.

The localization key may include an installer program that requires the user to do no more than interface the localization key to the first electronic device, and the installer program will automatically install the localization by selecting the appropriate localization profile including the language, currency, time zone and other localization items as needed. This is particularly useful where the customer does not speak the English language, and may otherwise have to manually perform the localization in the English language. So, those who provide the localization key may prepare a plurality of localizations keys each having an indication of a particular localization profile, and different localization keys may be prepared with different indications for different localization profiles. Thus, when the customer's location is determined, the appropriate localization key may be selected for delivery with the electronic device.

As an alternative, embodiments may perform a portion of the localization such as the language, and allow the customer to manually select the other items for localization, using a method such as a series of prompts, for example. Further, the localization profiles may all be stored on the localization key instead of on the electronic device. This is more feasible as various types of computer-readable medium have more memory than in the past, such as USB flash drives. In this situation, the appropriate localization profile may be selected on the localization key after the customer location is determined, and then delivered with the electronic device.

Embodiments as disclosed herein may include computer-readable medium for carrying or having computer-executable instructions or data structures stored thereon. Such computer-readable medium can be any available medium that can be accessed by a general purpose or special purpose computer. By way of example, and not limitation, such computer-readable medium can comprise RAM, ROM, EEPROM, CD-ROM or other optical disk storage, magnetic disk storage or other magnetic storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. The instructions for carrying out the functionality of the disclosed embodiments may be stored on such a computer-readable medium.

The instructions from a computer-readable medium may be used by an electronic device, such as first electronic device 210, to cause the functionality of the embodiments to occur. These instructions may be loaded into a memory of the first electronic device 210 to be executed by a processor as needed.

Figure 3:
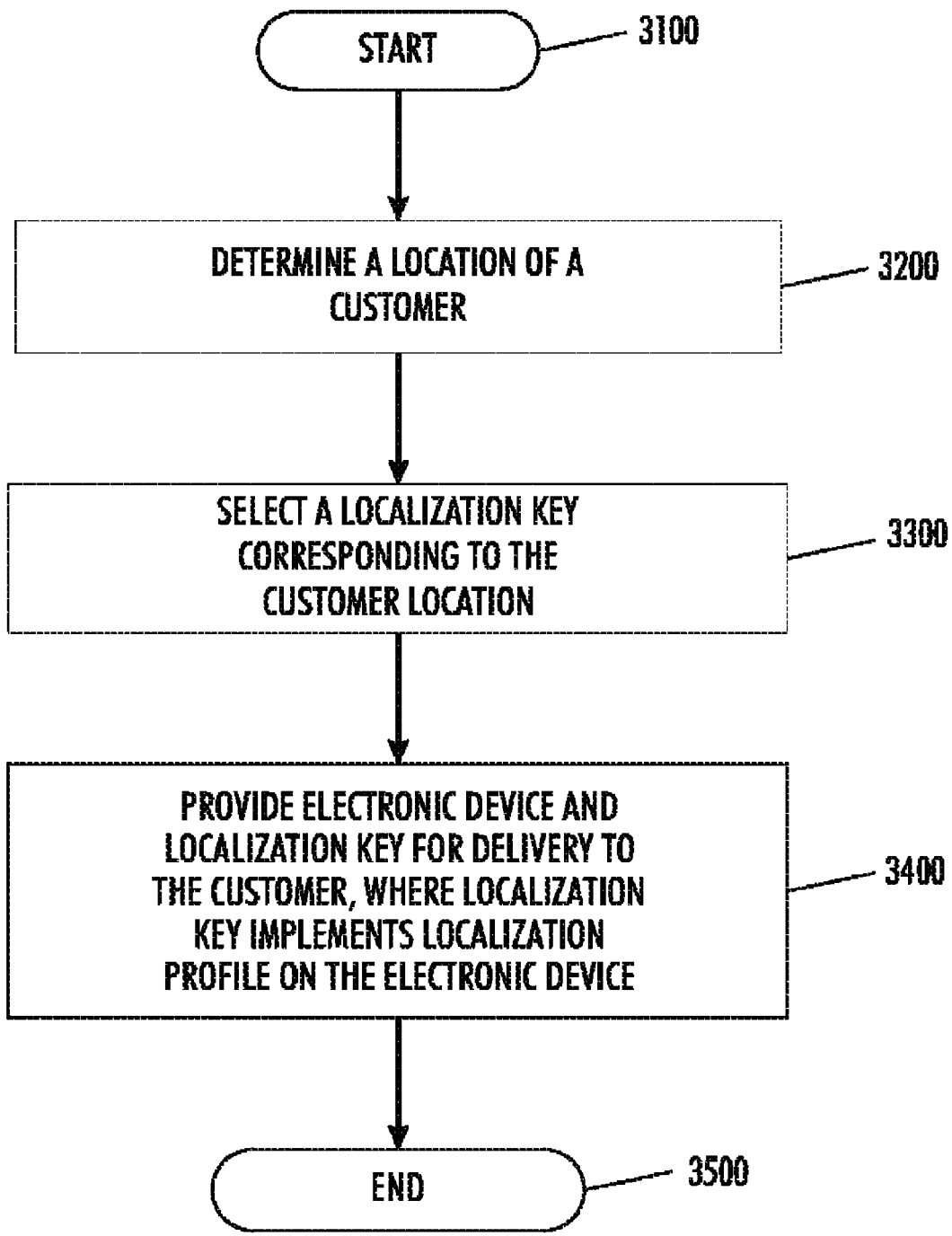
FIG. 3 illustrates a flowchart of a method for establishing communication parameters for communicating between a first electronic device and a second electronic device.

FIG. 3 illustrates a flowchart of a method for performing localization for an electronic device. The method starts at 3100. At 3200, a location of the customer is determined. The location that is determined only needs to be as specific as needed for localization. For example, if the localization that is to be set up on electronic devices is the same for an entire country, then the location that is determined only needs to be the country. However, a particular country may have more than one language, such as Belgium, or more than one time zone, for example. In this case, the location that is determined can be more specific than the country, and each country may have a plurality of corresponding localization profiles.

At 3300, a localization key is selected corresponding to the determined customer location. The localization key may have an indication of the corresponding localization profile to be implemented on the electronic device, or in embodiments where the localization profiles are all stored on the localization key, an indication of the selected localization profile to be selected from those stored on the localization key.

At 3400, the localization key and electronic device are provided for delivery to the customer. At 3600, the method ends.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of creating a localization key that is delivered to a customer with an electronic device, comprising:
   receiving location information of the customer, the location information including at least country and time zone information;
   selecting one or more localization profiles corresponding to the location information of the customer, the one or more localization profiles including at least language and time zone information; and
   storing the one or more localization profiles onto a localization key, wherein the localization key is a memory device that is separate from the electronic device and the electronic device is one of a scanner, a printer, a copier, a facsimile device, and a combination device that includes at least two of a scanner, a printer, a copier, and a facsimile device, and
   wherein the localization key and the electronic device are delivered to the customer and when the localization key is interfaced with the electronic device, at least one of the one or more localization profiles is installed to enable the electronic device to operate using the language and time zone information included with the one of the one or more localization profiles.

2. The method of claim 1, wherein one of the one or more localization profiles is automatically selected and installed by the electronic device.

3. The method of claim 1, wherein one of the one or more localization profiles is automatically installed by the electronic device after being selected by the customer.

4. The method of claim 1, where the localization key includes instructions stored thereon to select one of the one or more localization profiles corresponding to a specific location.

5. The method of claim 1, wherein the localization key is a Universal Serial Bus (USB) key.

6. The method of claim 1, wherein the one or more localization profiles include currency information.

7. The method of claim 1, wherein the electronic device includes an installer program to install one of the one or more localization profiles on the electronic device after being interfaced with the localization key without further input from the customer.

8. The method of claim 1, wherein the localization key includes an installer program to install one of the one or more localization profiles on the electronic device without further input from the customer.

9. A localization key that is delivered to a customer with an electronic device, comprising:
   a memory that stores one or more localization profiles relating to location information for a customer, the location information including at least country and time zone information and the one or more localization profiles including at least language and time zone information, and
   an interface that connects the localization key to the electronic device, wherein the localization key is a memory device that is separate from the electronic device and the electronic device is one of a scanner, a printer, a copier, a facsimile device, and a combination device that includes at least two of a scanner, a printer, a copier, and a facsimile device, and
   wherein the localization key and the electronic device are delivered to the customer and when the localization key is interfaced with the electronic device using the interface, at least one of the one or more localization profiles is installed from memory to enable the electronic device to operate using the language and time zone information included with the one of the one or more localization profiles.

10. The localization key of claim 9, wherein one of the one or more localization profiles is automatically selected and installed by the electronic device.

11. The localization key of claim 9, wherein one of the one or more localization profiles is automatically installed by the electronic device after being selected by the customer.

12. The localization key of claim 9, wherein the localization key is a Universal Serial Bus (USB) key.

13. The localization key of claim 9, wherein the one or more localization profiles include currency information.

14. The localization key of claim 9, further comprising an installer program stored in the memory that installs one of the one or more localization profiles on the electronic device without further input from the customer.

15. A computer-readable medium storing instructions for controlling a computing device for creating a localization key that is delivered to a customer with an electronic device, the instructions comprising:

receiving location information of the customer, the location information including at least country and time zone information;

selecting one or more localization profiles corresponding to the location information of the customer, the one or more localization profiles including at least language and time zone information; and storing the one or more localization profiles onto a localization key, wherein the localization key is a memory device that is separate from the electronic device and the electronic device is one of a scanner, a printer, a copier, a facsimile device, and a combination device that includes at least two of a scanner, a printer, a copier, and a facsimile device, and wherein the localization key and the electronic device are delivered to the customer and when the localization key is interfaced with the electronic device, at least one of the one or more localization profiles is installed to enable the electronic device to operate using the language and time zone information included with the one of the one or more localization profiles.

16. The computer-readable medium of claim 15, wherein the computer-readable medium comprises a Universal Serial Bus (USB) localization key.

17. The computer-readable medium of claim 15, wherein one of the one or more localization profiles is automatically selected and installed by the electronic device.

18. The computer-readable medium of claim 15, wherein one of the one or more localization profiles is automatically installed by the electronic device after being selected by the customer.

* * * * *